(12) United States Patent
Limketkai

(10) Patent No.: US 9,142,167 B2
(45) Date of Patent: Sep. 22, 2015

(54) THIN-FILM TRANSITOR BACKPLANE FOR DISPLAYS

(75) Inventor: Benjie N. Limketkai, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/997,768

(22) PCT Filed: Dec. 29, 2011

(86) PCT No.: PCT/US2011/067726
§ 371 (c)(1),
(2), (4) Date: Jun. 25, 2013

(87) PCT Pub. No.: WO2013/101022
PCT Pub. Date: Jul. 4, 2013

(65) Prior Publication Data
US 2013/0342435 A1    Dec. 26, 2013

(51) Int. Cl.
*G09G 3/34* (2006.01)
*G09G 3/36* (2006.01)
*G02F 1/167* (2006.01)

(52) U.S. Cl.
CPC ................ *G09G 3/344* (2013.01); *G02F 1/167* (2013.01); *G09G 3/3655* (2013.01); *G09G 3/3659* (2013.01); *G09G 2300/0876* (2013.01);
(Continued)

(58) Field of Classification Search
CPC ....... G09G 3/34; G09G 3/344; G09G 3/3655; G09G 3/3659; G09G 2300/0876; G09G 2320/0233; G09G 2360/144; G09G 2310/024; G02F 1/167

USPC .................... 345/87–107, 204–215
See application file for complete search history.

(56) References Cited

U.S. PATENT DOCUMENTS

| | | | |
|---|---|---|---|
| 5,296,847 A * | 3/1994 | Takeda et al. | 345/92 |
| 5,526,012 A * | 6/1996 | Shibahara | 345/92 |
| 5,952,991 A * | 9/1999 | Akiyama | 345/98 |

(Continued)

FOREIGN PATENT DOCUMENTS

| | | |
|---|---|---|
| JP | 09-138428 A | 5/1997 |
| JP | 2006-308632 A | 11/2006 |

(Continued)

OTHER PUBLICATIONS

International Search Report and Written opinion for PCT Patent Application No. PCT/US2011/067726, mailed on Sep. 21, 2012, 16 Pages.

(Continued)

*Primary Examiner* — Vijay Shankar
(74) *Attorney, Agent, or Firm* — Alpine Technology Law Group LLC

(57) ABSTRACT

An electro-optical element may be controlled by a circuit. The circuit may include two transistors having a control capacitor coupled to the common node of the two transistors. The control capacitor may be charged to a value through the selection transistor during the row selection period. The amount of the charge stored in the control capacitor may be used by the charge transistor to properly charge the display capacitance to the intended value after the row selection period and an electric field created from the charge of the display capacitance used to control the electro-optical element.

28 Claims, 8 Drawing Sheets

(52) U.S. Cl.
CPC ............... *G09G2310/0248* (2013.01); *G09G 2320/0233* (2013.01); *G09G 2360/144* (2013.01)

(56) References Cited

U.S. PATENT DOCUMENTS

| | | |
|---|---|---|
| 6,847,414 B2 | 1/2005 | Chen |
| 6,912,082 B1 | 6/2005 | Lu et al. |
| 7,324,075 B2 | 1/2008 | Sano et al. |
| 7,710,376 B2 * | 5/2010 | Edo et al. .................. 345/92 |
| 2005/0057478 A1 * | 3/2005 | Miyazawa .................. 345/96 |
| 2006/0181497 A1 | 8/2006 | Edo et al. |

FOREIGN PATENT DOCUMENTS

| | | |
|---|---|---|
| TW | 554444 B | 9/2003 |
| TW | 1251184 B | 3/2006 |
| WO | 2013/101022 A1 | 4/2013 |

OTHER PUBLICATIONS

International Preliminary Report on Patentability and Written Opinion received for PCT Patent Application No. PCT/US2011/067726, mailed on Jul. 10, 2014, 13 pages.

Office Action received for Taiwanese Patent Application No. 101150138 mailed on Mar. 25, 2015, 7 pages, including 3 pages of English translation.

Office Action received for Taiwanese Patent Application No. 101150138 mailed on Oct. 14, 2014, 30 pages, including 17 pages of English translation.

* cited by examiner

THIN-FILM TRANSITOR BACKPLANE FOR DISPLAYS

BACKGROUND

The present subject matter relates to electronic displays. More specifically, the present subject matter relates to circuits to control arrays of electro-optical elements.

Some types of electronic displays may utilize relatively high voltages (>5-10V). Circuits for displays such as electrophoretic, cholesteric liquid crystal, and other low-power, bistable displays, as well as more traditional liquid crystal displays (LCD), may be designed to control individual regions of the display using a voltage level or electric field created across the individual regions. The individual regions may commonly be referred to as a pixel, a sub-pixel, a picture element (pel) or an electro-optical element.

These electronic displays may be refreshed by storing particular amounts of charge into capacitances associated with the electro-optical elements of an individual row, then repeating this operation for the other rows of the display. The number of rows of pixels, in combination with the rate that the display is updated, may determine the amount of time that is available to store charge into the associated capacitances.

Voltage-driven displays may have a single thin film transistor (TFT) a teach electro-optical element. However, due to the relatively high voltage that may be present across the TFT for some displays, or relatively poor TFT performance due to materials used or fabrication methods, many TFTs used for displays may have a high leakage current in some designs, the TFT may be designed to have lower leakage, but that may result in lower on-state current. Either high leakage or lower on-state current may limit resolution, display size, gray scale capability, or other display characteristics, due to the limited time available to charge the capacitances associated with individual electro-optical elements.

BRIEF DESCRIPTION OF THE DRAWINGS

The accompanying drawings, which are incorporated in and constitute part of the specification, illustrate various embodiments. Together with the general description, the drawings serve to explain various principles. In the drawings.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures and components have been described at a relatively high-level, without detail, in order to avoid unnecessarily obscuring aspects of the present concepts. A number of descriptive terms and phrases are used in describing the various embodiments of this disclosure. These descriptive terms and phrases are used to convey a generally agreed upon meaning to those skilled in the art unless a different definition is given in this specification. Reference now is made in detail to the examples illustrated in the accompanying drawings and discussed below.

Figure 1:
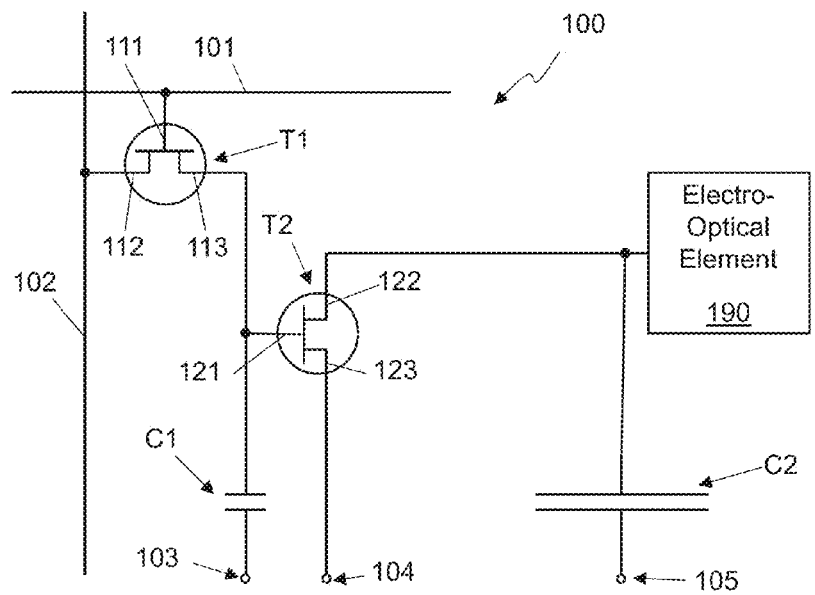
FIG. 1 is a schematic diagram of an embodiment of a circuit to control an electro-optical element.

FIG. 1 is a schematic diagram of an embodiment of a circuit 100 to control an electro-optical element 190. The circuit 100 may be incorporated in a backplane of a display. The electro-optical element 190 may be a part of any type of display element that may be controlled using a voltage or an electric field, including, but not limited to, an electrophoretic or other type of bistable display, or a LCD. The circuit 100 may include a first transistor T1 coupled to a first control line 101 and a second control line 102, a second transistor T2 coupled to the first transistor T1 and the electro-optical element 190; and a control capacitor C1 coupled to the second transistor T2. Although the capacitance of the electro-optical element 190 may be large enough to allow the circuit 100 to function properly in some cases, in some embodiments a hold capacitor C2 may be included to increase the amount of capacitance available to store charge to control the electro-optical element 190. "Display capacitance" may refer to the combined capacitance of the electro-optical element 190 and the hold capacitor C2, or to the capacitance of the electro-optical element 190 alone, if no hold capacitor C2 is included.

Although various embodiments may use various topologies of electro-optical elements 190 and associated control circuits 100 and/or different terminology for the various lines and components, in some embodiments the electro-optical elements may be laid out in a grid, or array of pixels, with the associated control circuits 100 physically near to their respective electro-optical elements 190. In some embodiments, the first control line 101 may be referred to as a row address line and the second control line 102 may be referred to as a column data line. The row address line 101 may be asserted to identify a period of time that the particular row including the electro-optical element 190 is being accessed and the column data line 102 may be used to determine a characteristic of the electro-optical element 190, such as an intensity, brightness, color, or other characteristic.

Although various embodiments of the circuit 100 may vary, in the embodiment shown the first transistor T1 may be referred to as a selection transistor and the control gate 111 of the first transistor T1 may be coupled to the first control line 101, The second control line 102 may be coupled to the drain 112 of the first transistor T1. The source 113 of the first transistor T1 may be coupled to one terminal of the control capacitor C1 and to the control gate 121 of the second transistor T2, which may be referred to as the charge transistor. The drain 122 of the second transistor T2 may be coupled to the electro-optical element 190. If the hold capacitor C2 is included, it may have one terminal coupled to the electro-optical element 190 and the drain 122 of the second transistor T2.

The other terminal of the control capacitor C1, or node 103, the source 123 of the second transistor T2, or node 104, and the other terminal of the hold capacitor C2, or node 105, may be coupled to various lines in various embodiments, depending on the topology of the overall display as well as the characteristics of the control lines used to drive the display. While various embodiments may couple node 103, node 104 and node 105 in numerous ways, several different embodiments are described later in this disclosure. Other embodiments may couple node 103, node 104 and node 105 in ways differently than those described, however, and may drive the various nodes and control lines using waveforms that differ from the waveforms described.

The transistors may be any type of electronic switching device including, but not limited to, bipolar junction transistors (BJT), carbon nanotube transistors, metal-oxide semiconductor field-effect transistors (MOSFET), or thin-film transistors (TFT). The transistors may utilize various materials including, but not limited to, silicon (Si), germanium (Ge), gallium-arsenide (GaAs), compounds of Si or Ge, and/or other semiconducting materials, including various organic compounds. The capacitors may be discrete components or may be integrated with the transistors, the electro-optical elements, the substrate of a display, or any other component. The terms control gate, source and drain are used in this disclosure to describe the terminals of the transistors. While those terms may generally apply to a subset of transistors, they are used herein to describe the terminals of a wider range of transistors than are generally applicable in the art. In general, the term "control gate" is used to describe the terminal of the transistor that controls the state of the transistor, such as the control gate of a MOSFET or the gate of a BJT. "Source" and "drain" may be used to describe the other two terminals with current more commonly flowing from the source to the drain. But it will be understood by one or ordinary skill that in many types of transistors, the current flow between source and drain may be in either direction, depending on the voltages applied to the transistor, and the terms "source" and "drain" may be interchangeable for many types of transistors.

The use of two transistors per pixel may decouple two characteristics of a circuit to operate the display that are linked if only one transistor is used. If two transistors are used, one transistor may be the selection transistor T1, and may be optimized to quickly store a voltage setting for a pixel into the control capacitor C1. The second transistor may be the charge transistor T2 and may be optimized to charge and hold the display capacitance to a voltage that may be greater than about 5 volts in some embodiments. Because the charge transistor T2 may be controlled independently from the timing of the row address line 101, the charge transistor T2 may be able to be on and charging the display capacitance after the row address line 101 has been deasserted and other rows of the display are being addressed. This may decouple the number of rows from the maximum allowable size of the display capacitance. If only one transistor is used, as the number of rows of pixels increases, the time that a given row is addressed decreases, assuming that the refresh rate of the entire display is constant. As the time that a given row is addressed decreases, the maximum allowable capacitance that may be charged to a given voltage also decreases, given a constant on-resistance of the transistor. If the on-resistance of the transistor is increased to decrease the charging time of the capacitance, there may be a trade-off with an increase in leakage current of the transistor. An increased leakage current may more quickly deplete the charge of the display capacitance, decreasing the performance of the display. By providing two transistors per pixel, the selection transistor T1 may be optimized for high switching speed and low on-resistance, without much regard for leakage current or off-state resistance, and the charge transistor T2 may be optimized for low off-state leakage current without much regard for switching speed or on-state resistance. With such optimization, the selection transistor T1 may have faster switching speed and lower on-state resistance than the charge transistor T2 and/or the charge transistor T2 may have lower off-state leakage current than the selection transistor T1.

The circuit 100 may function by using the first transistor T1 to charge a control capacitance C1 based on a desired characteristic of the electro-optical element 190. The voltage level of the column data line 102, during the time that the row address line 101 is asserted, may determine charge of the control capacitance C1. The second transistor T2 may charge the display capacitance, including the hold capacitor C2 and the electro-optical element 190, based on the charge of the control capacitance C1. An electric field based on the charge of the display capacitance may control a characteristic of the electro-optical element 190.

In some embodiments, the control capacitor C1 may have a smaller capacitance than the electro-optical element 190, while in other embodiments the control capacitor C1 may have a smaller capacitance than the hold capacitor C2. Due to the smaller capacitance of the control capacitor C1, the time to charge the control capacitance C1 may be smaller than the time to charge the display capacitance.

Figure 2:
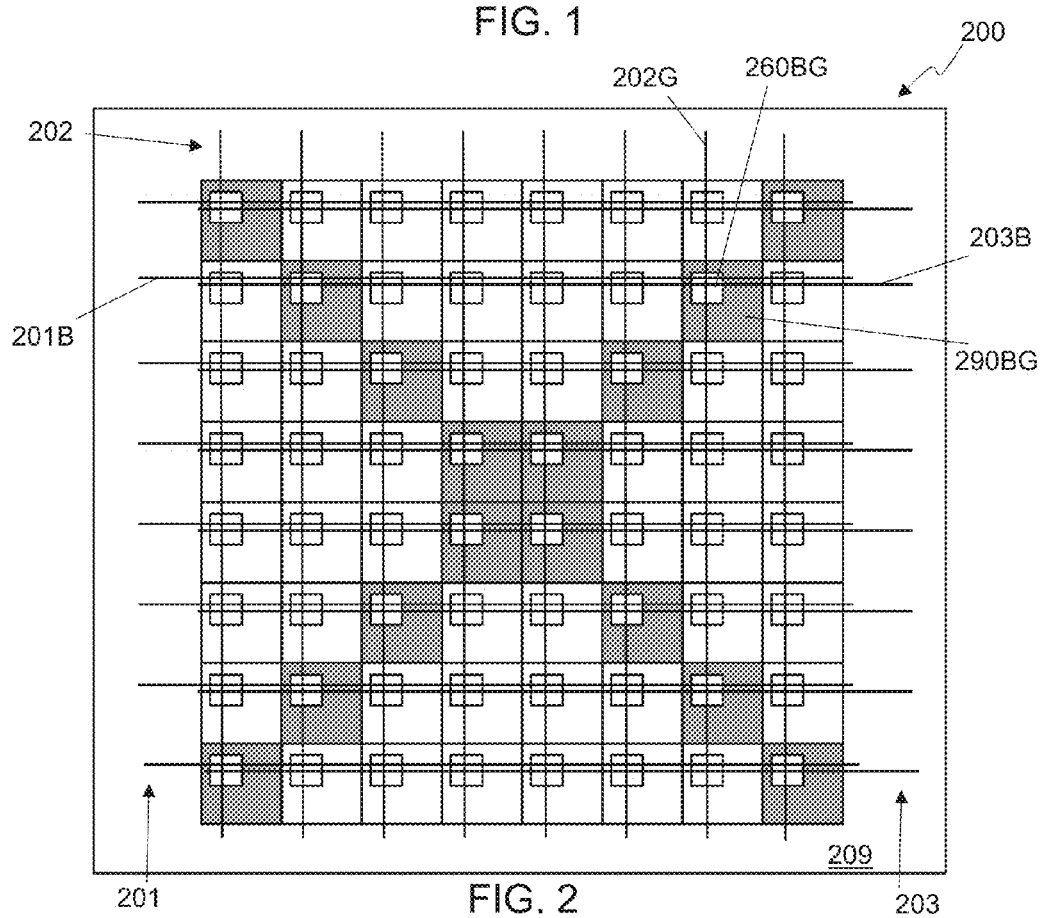
FIG. 2 shows an embodiment of a display.

FIG. 2 shows an embodiment of a display 200. The display 200 is shown displaying an "X" character. The display 200 may include a substrate 209 that may be a rigid material such as ceramic, glass, silicon, or some other opaque or transparent rigid material, depending on the embodiment. In other embodiments, the substrate 209 may be flexible and may be made of a polymer or other organic material. The substrate 209 may be made of other types of materials in other embodiments. The display 200 may include an array of electro-optical elements such as the 8×8 array of electro-optical elements shown, including electro-optical element 290BG, although various embodiments may have any size array of electro-optical elements including arrays with a different number of rows than columns and very large arrays including millions of pixels, or even larger arrays. The display 200 may also include an array of control circuits coupled to respective electro-optical elements such as control circuit 260BG. The control circuits may include embodiments of circuitry such as those described herein, or other topologies of circuitry.

Row address lines 201, including row address line 201B, and column data lines 202, including column data line 202G, may be included on the display 200 to allow specific electro-optical elements to be selected. Drive control lines 203 including drive control line 203B may provide charging current for the display capacitance of the electro-optical elements. The various row address lines 201 and drive control lines 203 may be substantially parallel with each other. "Substantially parallel" may mean that the overall direction of the lines, as they cross the display 200 may be less than about 10 degrees from parallel. If the lines diverge or cross for small distances, or diverge, cross, or are otherwise non-parallel once they are no longer in the display area, that may not mean that the lines are not substantially parallel. The column data lines 202 may be substantially perpendicular to the row address lines 201 and drive control lines 203. "Substantially perpendicular" may mean that the overall direction of the lines as they cross the display 200 may create an angle of about 90 degrees plus or minus about 10 degrees.

In various embodiments, the display 200 may include electrophoretic elements for the electro-optical elements. In other embodiments, the display 200 may be some other type of electronic paper or bistable display. In alternative embodiments, the display 200 may be a liquid crystal display (LCD) with liquid crystal display elements used for the electro-optical elements. Other types of display technology may be used for other embodiments of the display 200 but in many embodiments, the electro-optical elements may be controlled by electric fields created by the control circuitry.

In some embodiments, the control circuits may include thin film transistors (TFT) on the substrate 209. The TFTs may include inorganic materials such as amorphous silicon and metal-oxides, but in other embodiments, the TFTs may include organic materials. The TFTs may be rigid or flexible, depending on the embodiment, and may be manufactured using one or more suitable process, including, but not limited to, vapor deposition, lithography, wet or dry chemical etching, printing, or any other suitable process. The various TFTs may be optimized for their function, and in some embodiments, a circuit may have a first transistor with a higher ratio of gate width to gate length than a second transistor. In some embodiments, the first transistor has a faster switching speed than the second transistor and the second transistor has lower leakage current than the first transistor.

As an example of one control circuit that may be used in some embodiments of the display 200, the control circuit 260BG may include a selection transistor coupled to row address line 201B and column data line 202G. A charge transistor may be coupled to the selection transistor and electro-optical element 290BG. A control capacitor may be coupled to the charge transistor and a hold capacitor may be coupled to the electro-optical element 290BG. In some embodiments, a hold capacitor may be coupled to the electro-optical element 290BG if the capacitance of the electro-optical element 290BG is not large enough. The charge stored in the display capacitance, which may include the hold capacitor, may be used to create an electric field across the electro-optical element 290BG to control the intensity, color, or other characteristic of the electro-optical element 290BG. In various embodiments, the control capacitor C1 may be coupled to the drive control line 203B or some other line, the source of the charge transistor may be coupled to the drive control line 203B or some other line, and the hold capacitor may be coupled to the row address line 201B, or some other line.

Control circuit 260BG may function by setting a control capacitor to a first voltage during a row selection period using a selection transistor. The row address line 201B, coupled to the selection transistor, may indicate the row selection period. The first voltage may be determined based on a target characteristic of the electro-optical element 290BG and set using column data line 202G. Once the control capacitor has been set to the first voltage, which may be after the row selection period is completed, a charge transistor may be used to set a hold capacitor to second voltage during a charging period based on a voltage level of the control capacitor. Drive control line 203B, coupled to the charge transistor, may be used to set the second voltage. The charging period may be longer than the row selection period in some embodiments. The charging period may overlap with the selection period for other rows as indicated by the other row address lines 201.

Figure 3A:
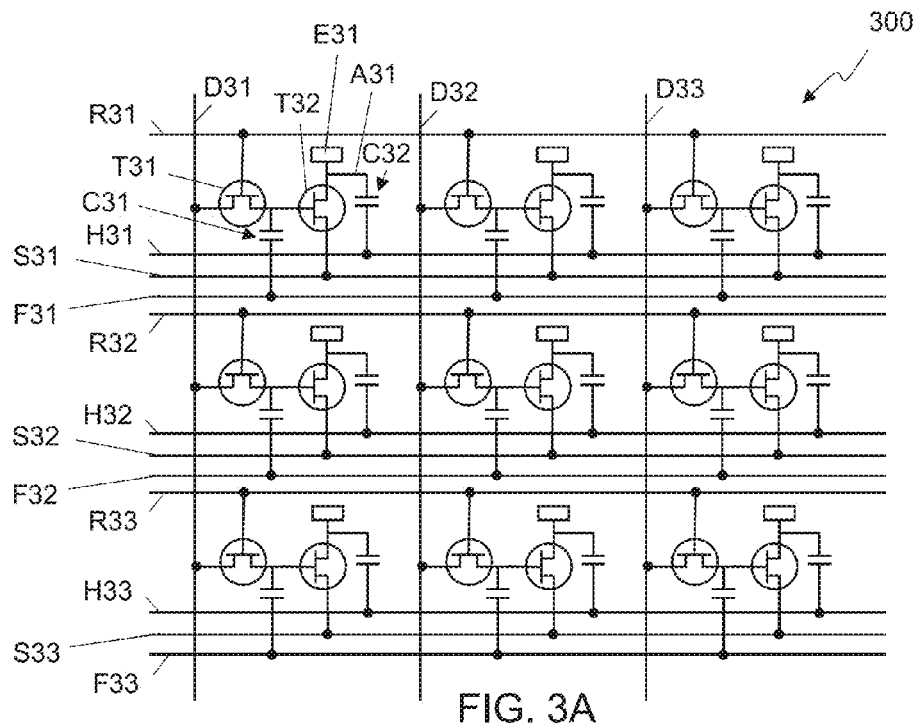
FIG. 3A is a schematic diagram of an array of circuits to control an array of electro-optical elements according to an embodiment.

FIG. 3A is a schematic diagram of an array of circuits 300 to control an array of electro-optical elements according to an embodiment. A 3×3 array of circuits is shown which may be thought of as a small part of a larger array of circuits with many more rows and many more columns than those shown in FIG. 3A. The circuits include the basic circuitry as shown in FIG. 1. Various row address lines such as the first row address line R31, the second row address line R32 and the third address line R33 may be used to select a particular row of the array. Various column data lines, such as the first column data line D31, the second column data line D32, and the third column data line D33, may be used to send voltages representing intended display characteristics to the currently selected row of circuits. Various other control lines such as the first charge control line F31, the second charge control line F32, the third charge control line F33, the first drive control line S31, the second drive control line S32, the third drive control line S33, the first display control line H31, the second display control line H32 and the third display control line H33, may be coupled to the circuits.

The upper left circuit may be typical of any of the circuits of the array 300 and is described in more detail to illustrate the operation of the circuits of the embodiment shown in FIG. 3A. The circuit may include a selection transistor T31 coupled to the first row address line R31 and the first column data line D31. The first row address line R31 may be coupled to the control gate of the selection transistor T31 and the first column data line D31 may be coupled to the drain of the selection transistor T31. A charge transistor T32 may be coupled to the selection transistor T31 and the electro-optical element E31 associated with the circuit. The control gate of the charge transistor T32 may be coupled to the source of the selection transistor T31 and the drain of the charge transistor T32 may be coupled to the electro-optical element E31. A control capacitor C31 may be coupled between the control gate of the charge transistor T32, and the first charge control line F31. The first drive control line S31 may be coupled to the source of the charge transistor T32. The embodiment shown includes a hold capacitor C32 coupled between the electro-optical element E31 and the first display control line H31. The electro-optical element E31 may have a second terminal at a ground potential so that a voltage level at node A31 may represent the electric field applied across the electro-optical element E31.

Figure 3B:
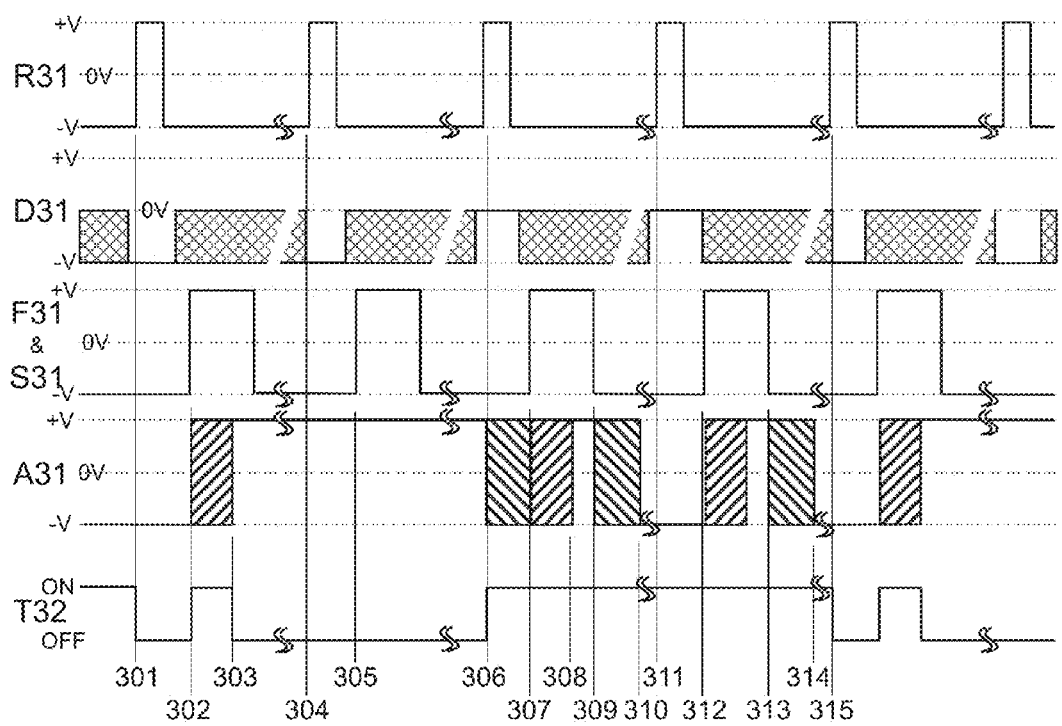
FIG. 3B shows waveforms at various nodes of the circuit of FIG. 3A.

FIG. 3B shows waveforms at various nodes of the circuit of FIG. 3A. Time progresses from left to right but may not be uniform. In particular, a much longer period of time than would be indicated by the waveform may elapse at each break shown such as the break between time 303 and time 304. The waveforms for the first row address line R31, the first column data line D31, the first drive control line S31/first charge control line F31 and node A31 are shown with a voltage scale ranging from −V to +V volts. In various embodiments, −V and +V may or may not be symmetrical about ground and in some embodiments may both be positive voltages, or may both be negative voltages. In some embodiments, the various lines may use a common voltage swing as shown, but some embodiments may utilize differing voltage swings for the various lines. In the particular embodiment shown, the first charge control line F31 and the first drive control line S31 are driven with identical waveforms, so a single waveform is shown for the two lines. The first display control line H31 is held at ground (0V) for the period shown, so no waveform is included. The waveform for the charge transistor T32 does not represent a voltage, but represents the switching state of the charge transistor T32. The charge transistor T32 may be conducting current between its source and drain if in the "ON" state and may represent a high impedance between its source and drain if in the "OFF" state. In the embodiment shown, it is assumed that the threshold voltage from control gate to the source or drain to turn on either transistor is about 2 volts and that the voltage drop between the source and drain if a transistor is "on" is negligible.

At the beginning of the waveforms of FIG. 3B, node A31 is at −V, which may create an electric field to set a state of the electro-optical element E31, such as "white." The first row address line R31 is asserted at time 301, turning on the selection transistor T31 and allowing the voltage applied at the first column data line D31, −V, to flow through the selection transistor T31 to the control capacitor C31. Since the first charge control line F31 is at −V, a charge of 0 volts is stored in the control capacitor C31. The capacitance of the control capacitor C31, and the switching speed and on-resistance of the selection transistor, are designed so that the control capacitor is charged to the voltage level of the first column data line D31 during the time that the first row address line R31 is asserted, In some embodiments, this may be done by making the sum of the switching time of the selection transistor T31 and three times the time constant based. on the capacitance of the control capacitor C31 and on-resistance of the selection transistor T31, less than the time period that the first row address line R31 is asserted. The selection transistor T31 turns off once the first row address line R31 is deasserted back to −V.

At time 302, after the row address line R31 has been deasserted, the first charge control line F31 and the first drive control line S31 are driven to +V. This turns on the charge transistor T32 and current may begin to flow from the first drive control line S31 into the display capacitance of the electro-optical element E31 and the hold capacitor C32. Because the charge transistor T32 may be optimized for low leakage current, the switching speed and/or on-resistance of the charge transistor T32 may increase the time to charge the display capacitance, so the voltage at node A31 may take some time to approach the voltage of the first drive control line S31. In some embodiments, the time to charge the display capacitance may be significantly longer than the time period allotted to address a single row, which may be represented by the time period that the first row address line R31 is asserted. Once the display capacitance is charged to within the voltage threshold of the voltage at the control gate of the charge transistor T32 at time 303, the charge transistor T32 turns off and holds the charge of the display capacitance even after the first charge control line F31 and the first drive control line S31 go back to −V. The +V voltage stored on the display capacitance may create an electric field to change the state of the electro-optical element from "white" to "black."

Depending on the embodiment, the length of time that the first charge control line F31 and the first drive control line S31 are driven to +V may be much larger than the time period that the first row address line R31 is asserted and may overlap with the times that multiple other rows are addressed. The first charge control line F31 and the first drive control line S31 may, for example be driven high for the entire time that the second row address line R32 and the third row address line R33 are asserted, and may be held much longer in some cases. In various embodiments, the first charge control line F31 and the first drive control line S31 may be driven high from immediately after the first row address line R31 is deasserted after time 301, until any time before the first row address line R31 is reasserted at time 304. As such, the time that the first charge control line F31 and the first drive control line S31 are driven high may be a significant percentage of the display's frame refresh time, depending on the number or rows of pixels in the display and other details of the embodiment.

The first row address line R31 is reasserted at time 304, turning on the selection transistor T31 and allowing the voltage applied at the first column data line D31 to flow to the control capacitor C31. Since the voltage on the first column data line D31 is still −V, the charge of the control capacitor C31 is left at 0 volts. Once the first charge control line F31 and the first drive control line S31 are driven high at time 305, the charge transistor T32 may be left in the off state because node A31 is still high and with 0 volts of charge stored in the control capacitor C31, there is not enough voltage on the control gate to turn on the charge transistor T32. If, however, enough charge has leaked from the display capacitance that the voltage of node A31 has fallen to a point that is lower than the voltage on the control gate of the charge transistor T32, which is the voltage of the first charge control line F31 plus the charge of the control capacitor C31, by at least the voltage threshold of the charge transistor T32, charge transistor T32 may turn on and recharge the display capacitance. Even after the first charge control line F31 and the first drive control line S31 go back to −V, charge transistor T32 remains off, keeping the charge stored in the display capacitance so that the electric field created keeps the electro-optical element E31 "black."

The first row address line R31 is reasserted at time 306, turning on the selection. transistor T31, Since the voltage on the first column data line D31 is now at 0 volts and the first charge control line F31 is at −V, the control capacitor C31 is charged to +V and the voltage at the control gate of the charge transistor T32 is at 0 volts. With the first drive control line S31 at V, the charge transistor T32 turns on and starts to discharge the display capacitor causing the voltage at node A31 to start to drop. Once the first charge control line F31 and the first drive control line S31 are driven high at time 307, the control gate of the charge transistor T32 may be driven to as high as +2V due to the +V stored on the control capacitor C31, so the charge transistor T32 remains on. This causes the +V voltage of the drive control line S31 to start to recharge the display capacitor which may be fully charged again at time 308. At time 309, the first charge control line F31 and the first drive control line S31 are driven back to −V but the charge transistor T32 remains on due to the +V voltage stored on the control capacitor C31, so the display capacitance is discharged through the charge transistor T32, bringing node A31 back to −V at time 310. This changes the electric field across the electro-optical element E31 and may change the state of the electro-optical element from "black," back to "white."

The first row address line R31 is asserted again at time 311, turning on the selection transistor T31. Since the voltage on the first column data line D31 is again at 0 volts and the first charge control line F31 is at −V, the control capacitor C31 keeps its charge of +V and the charge transistor T32 remains on. Once the first charge control line F31 and the first drive control line S31 are driven to +V at time 312, the display capacitor starts to charge toward +V until the first charge control line F31 and the first drive control line S31 go back to −V at time 313, causing the display capacitance, as represented by node A31, to be discharged back to N at time 314. The electric field created by the −V voltage stored on the display capacitance may keep the state of the electro-optical element "white." The first row address line R31 is asserted again at time 315 with conditions similar to that at time 301. This has the same effect as the events following time 301 and the electro-optical element may be changed from "white" to "black."

As can be seen from the waveform of node A31, there may be some extraneous switching of the electric field across the electro-optical element E31 at the times that the node A31 is to be set to a low value, such as between time 306 and time 310 and between time 311 and time 314. While in some embodiments, this switching may be helpful in eliminating "ghost" images on the display, in other embodiments, the switching may not be noticeable due to the short length of time where the extraneous switching occurs, as compared with the overall frame refresh rate.

Figure 4A:
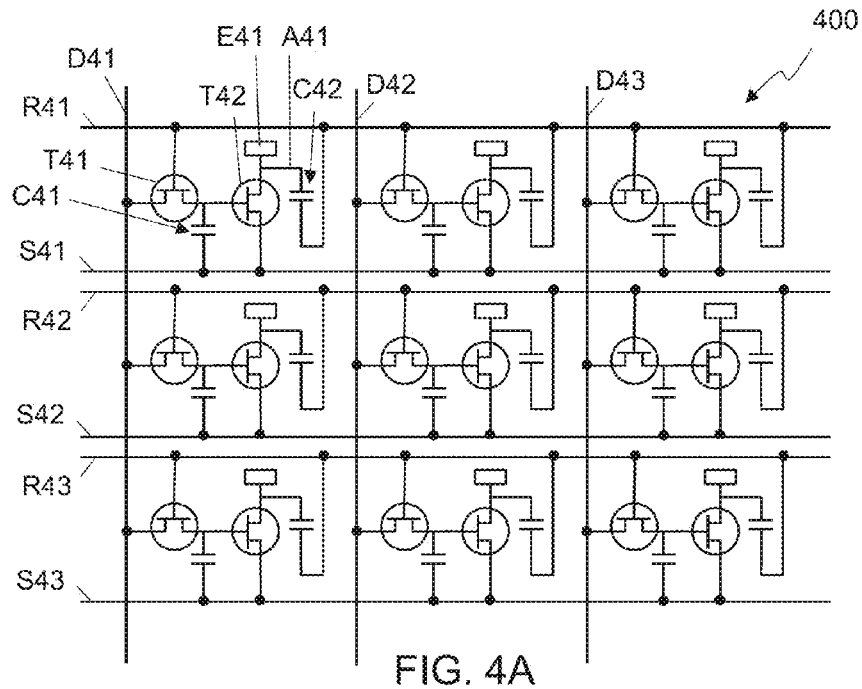
FIG. 4A is a schematic diagram of an array of circuits to control an array of electro-optical elements according to another embodiment.

It should also be pointed out that the description above is directed toward a single circuit controlling a single electro-optical element E31. Simultaneously with the operation of the circuit described, other circuits coupled to the first row address line R31, the first charge control line F31, the first drive control line S31, and the first display control line H31, may be independently controlling their respective electro-optical elements, dependent on the voltages driven on the column data lines that are coupled to those circuits, such as the second column data line D32 and the third column data line D33. In addition, circuits coupled to other row address lines, such as the second row address line R32 or the third row address line R33 may be independently controlling their respective electro-optical elements based on voltages driven on the column data lines during the time that the other row address lines are active. Because the various rows utilized the column data lines at differing times, the voltages on the column data lines may be changed between rows. And because the charging of the display capacitance occurs after the row address line is deasserted, the circuits of the various rows may independently charge their associated display capacitances during overlapping time periods FIG. 4A is a schematic diagram of an array of circuits 400 to control an array of electro-optical elements according to another embodiment. A 3×3 array of circuits is shown, which may be thought of as a small part of a larger array of circuits with many more rows and many more columns than those shown in FIG. 4A. The circuits include the basic circuitry as shown in FIG. 1. Various row address lines such as the first row address line R41, the second row address line R42 and the third address line R43 may be used to select a particular row of the array. Various column data lines, such as the first column data line D41, the second column data line D42, and the third column data line D43, may be used to send voltages representing intended display characteristics to the currently selected row of circuits. While providing separate charge control lines, drive control lines, and display control lines for individual rows, as done in the array of circuits 300 or FIG. 3A, may simplify the control of the circuits, it may not be practical in some embodiments. The embodiment shown in FIG. 4A eliminates the separate charge control lines and display control lines to simplify the physical layout of the array of circuits. Separate drive control lines are still included, however, such as the first drive control line S41, the second drive control line S42, and the third drive control line S43.

The upper left circuit may be typical of any of the circuits of the array 400 and is described in more detail to illustrate the operation of the circuits of embodiment shown in FIG. 4A. The circuit may include a selection transistor T41 coupled to the first row address line R41 and the first column data line D41. The first row address line R41 may be coupled to the control gate of the selection transistor T41 and the first column data line D41 may be coupled to the drain of the selection transistor T41. A charge transistor T42 may be coupled to the selection transistor T41 and the electro-optical element E41 associated with the particular circuit. The control gate of the charge transistor T42 may be coupled to the source of the selection transistor T41 and the drain of the charge transistor T42 may be coupled to the electro-optical element E41. A control capacitor C41 may be coupled between the control gate of the charge transistor T42, and the first drive control line S41. The first drive control line S41 may also be coupled to the source of the charge transistor T42. The embodiment shown includes a hold capacitor C42 coupled between the electro-optical element E41 and the first row address line R41. The electro-optical element E41 may have a second terminal at a ground potential so that a voltage level at node A41 may represent the electric field applied across the electro-optical element E41.

Figure 4B:
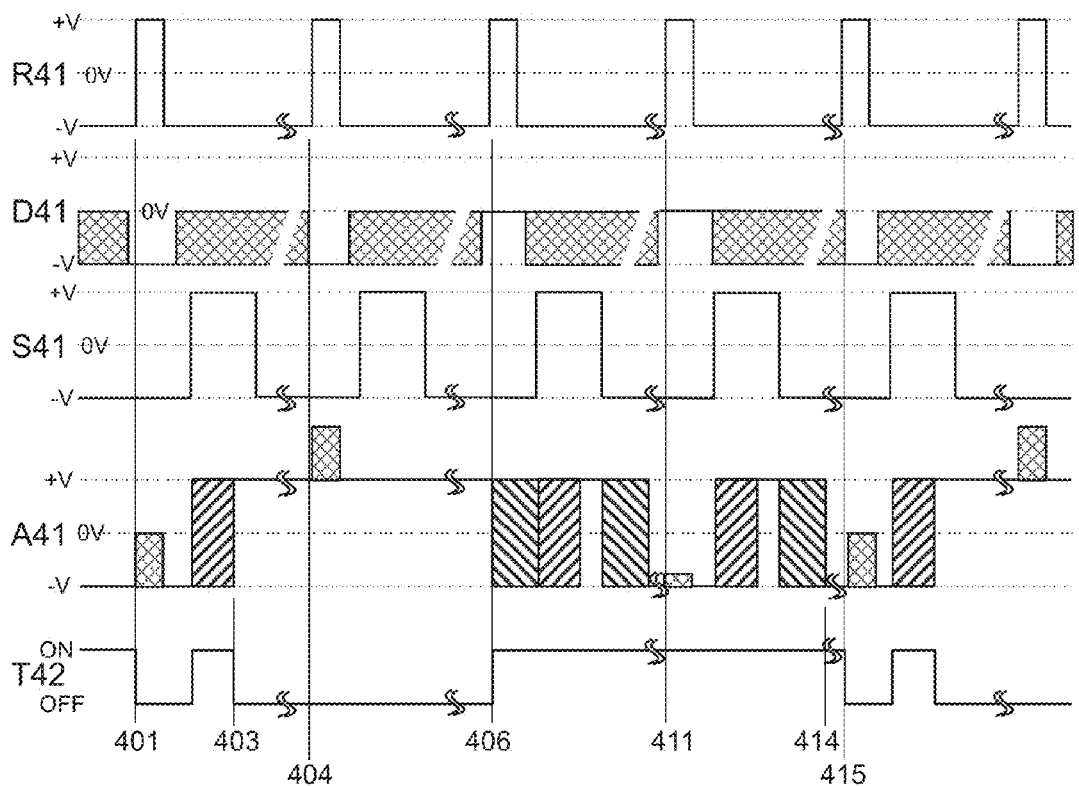
FIG. 4B shows waveforms at various nodes of the circuit of FIG. 4A.

FIG. 4B shows waveforms at various nodes of the circuit of FIG. 4A. Time progresses from left to right but may not be uniform. In particular, a much longer period of time than would be indicated by the waveform may elapse at each break shown, such as the break between time 403 and time 404. The waveforms for the first row address line R41, the first column data line D41, the first drive control line S41 and node A41 are shown with a voltage scale ranging from −V to +V volts. In various embodiments, −V and +V may or may not be symmetrical about ground and in some embodiments may both be positive voltages, or may both be negative voltages. In some embodiments, the various lines may use a common voltage swing as shown, but some embodiments may utilize differing voltage swings for the various lines. The waveform for the charge transistor T42 does not represent a voltage, but represents the switching state of the charge transistor T42. In the embodiment shown, it is assumed that the threshold voltage to turn on either transistor is about 2 volts and that the voltage drop from source to drain if a transistor is on is negligible.

The operation of the array of circuits 400 is very similar to the operation of the array of circuits 300 of FIG. 3A. At the beginning of the waveforms of FIG. 4B, node A41 is at −V, which may create an electric field to set the state of the electro-optical element E41, such as "white." The first row address line R41 is asserted at time 401, turning on the selection transistor T41 and allowing the voltage applied at the first column data line D41, −V, to flow through the selection transistor T41 to the control capacitor C41. The circuit behaves the same as circuit 300 in this case, charging node A41 to +V at time 403 to change the state of the electro-optical element E41 from "white" to "black."

One difference from the operation of circuit 300 can be seen in the behavior of node A41 at time 401. The hold capacitor C42 is coupled to the row address line R41, so if the row address line R41 is driven from −V to +V while the charge transistor T42 is off, the voltage change may be capacitively coupled to node A41 as can be seen from the noise spike shown on node A41 at time 401. Since there is already some extraneous switching of the electro-optical element E41 around that time that the row address line R41 is asserted, the additional noise may not create any issues.

The first row address line R41 is reasserted at time 404, turning on the selection transistor T41 and allowing the voltage applied at the first column data line D41 to flow to the control capacitor C41. Since the voltage on the first column data line D41 is still −V, the charge of the control capacitor C41 is left at 0 volts, and the circuit 400 behaves similarly to the circuit 300 to keep the electro-optical element E41 "black." Again the difference in behavior from circuit 300 is related to effects from the hold capacitor C41 being coupled to the row address line R41. If the first row address line R41 voltage changes, such as at time 404, the voltage change may be capacitively coupled to node A41 as shown by the noise spike at time 404. In many embodiments, the noise may not cause any problems, but circuit 400 may be designed to handle the higher potential voltage at A41.

The first row address line R41 is reasserted at time 406, turning on the selection transistor T41. Since the voltage on the first column data line D41 is now at 0 volts and the first drive control line S41 is at −V, the control capacitor C41 is charged to +V and circuit 400 behaves identically to circuit 300, changing the electro-optical element from "black," back to "white." The voltage change of the first row address line R41 may still capacitively couple to node A41, but because the charge transistor T42 is on at the time that the first row address line R41 is changing, the capacitive coupling may be mitigated somewhat by the low resistance path to the first drive control line S41, and node A41 is also in transition at time 406, which may make the coupled noise even less of an issue.

The first row address line R41 is asserted again at time 411, turning on the selection transistor T41, Since the voltage on the first column data line D41 is again at 0 volts and the first drive control line S41 is at −V, the control capacitor C41 keeps its charge of +V and the charge transistor T42 remains on and the circuit 400 behaves just as the circuit 300 to keep the electro-optical element "white" after time 414. The pulse on the first row address line R41 at time 411 may still be capacitively coupled to node A41, but as at time 406, the effects of the coupled noise may be mitigated because the charge transistor T42 is on. Noise below −V may be generated, however, on the negative-going edge of the pulse on the row address line R41 after time 411 so the circuit 400 may be designed to accommodate that. The first row address line R41 is asserted again at time 415 with conditions similar to that at time 401. This has the same effect as the events following time 401 and the electro-optical element may be changed from "white" to "black."

Figure 5A:
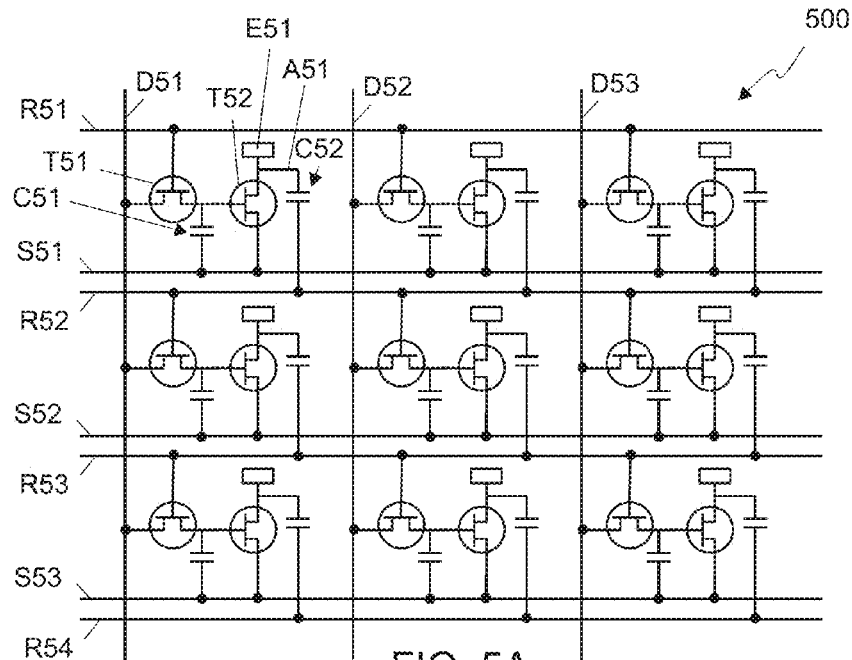
FIG. 5A is a schematic diagram of an array of circuits to control an array of electro-optical elements according to yet another embodiment.

FIG. 5A is a schematic diagram of an array of circuits 500 to control an array of electro-optical elements according to yet another embodiment. A 3×3 array of circuits is shown, which may be thought of as a small part of a larger array of circuits with many more rows and many more columns than those shown in FIG. 5A. The circuits include the basic circuitry as shown in FIG. 1. Various row address lines such as the first row address line R51, the second row address line R52 and the third address line R53 may be used to select a particular row of the array. Various column data lines, such as the first column data line D51, the second column data line D52, and the third column data line D53, may be used to send voltages representing intended display characteristics to the currently selected row of circuits. The embodiment shown in FIG. 5A provides separate drive control lines similar to circuit 400 of FIG. 4A, such as the first drive control line S51, the second drive control line S52, and the third drive control line S53.

The upper left circuit may be typical of any of the circuits of the array 500 and is described in more detail to illustrate the operation of the circuits of embodiment shown in FIG. 5A. The circuit may include a selection transistor T51 coupled to the first row address line R51 and the first column data line D51. The first row address line R51 may be coupled to the control gate of the selection transistor T51 and the first column data line D51 may be coupled to the drain of the selection transistor T51. A charge transistor T52 may be coupled to the selection transistor T51 and the electro-optical element E51 associated with the particular circuit. The control gate of the charge transistor T52 may be coupled to the source of the selection transistor T51 and the drain of the charge transistor T52 may be coupled to the electro-optical element E51. A control capacitor C51 may be coupled between the control gate of the charge transistor T52, and the first drive control line S51. The first drive control line S51 may also be coupled to the source of the charge transistor T52. The embodiment shown includes a hold capacitor C52 coupled between the electro-optical element E51 and the second row address line R52, which is different than the circuit 300 or the circuit 400. Coupling the adjacent row address line to the hold capacitor may provide for a more efficient layout in some embodiments. The electro-optical element E51 may have a second terminal at a ground potential so that a voltage level at node A51 may represent the electric field applied across the electro-optical element E51.

Figure 5B:
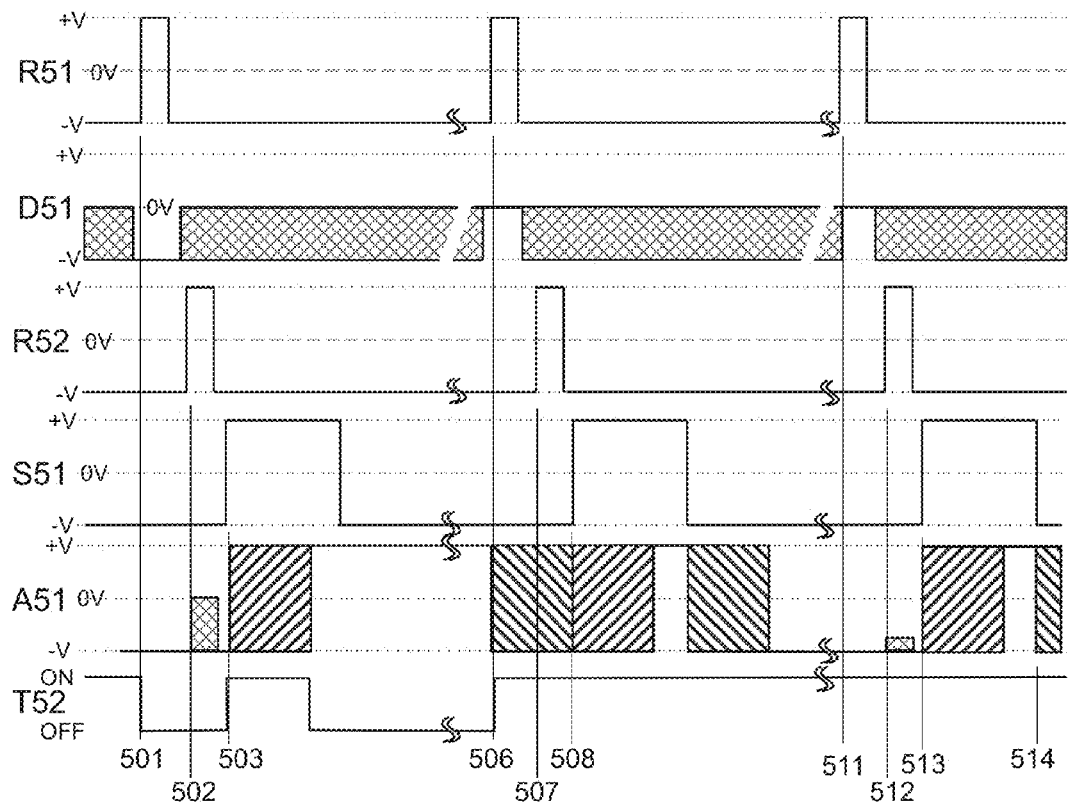
FIG. 5B shows waveforms at various nodes of the circuit of FIG. 5A.

FIG. 5B shows waveforms at various nodes of the circuit 500. Time progresses from left to right but may not be uniform. In particular, a much longer period of time than would be indicated by the waveform may elapse at each break shown, such as the break before time 506. The waveforms for the first row address line R51, the first column data line D51, the first drive control line S51, and node A51 are shown with a voltage scale ranging from −V to +V volts. In various embodiments, −V and +V may or may not be symmetrical about ground and in some embodiments may both be positive voltages, or may both be negative voltages. In some embodiments, the various lines may use a common voltage swing as shown, but some embodiments may utilize differing voltage swings for the various lines. The waveform for the charge transistor T52 does not represent a voltage, but represents the switching state of the charge transistor T52. In the embodiment shown, it is assumed that the threshold voltage to turn on either transistor is about 2 volts and that the voltage drop from source to drain if a transistor is on is negligible.

The operation of the array of circuits 500 is very similar to the operation of the array of circuits 300 of FIG. 3A. At the beginning of the waveforms of FIG. 5B, node A51 is at −V, which may create an electric field to set the state of the electro-optical element E51, such as "white." The first row address line R51 is asserted at time 501, turning on the selection transistor T51 and allowing the voltage applied at the first column data line D51, −V, to flow through the selection transistor T51 to the control capacitor C51.

Because the hold capacitor C52 is coupled to the second row address line R52, if the second row address line R52 is driven from −V to +V while the charge transistor T52 is off, the voltage change may be capacitively coupled to node A51 as can be seen from the noise spike shown on node A51 at time 502. Since there is already some extraneous switching of the electro-optical element E51 around that time that the second row address line R52 is asserted, the additional noise may not create any issues.

The first drive control line S51 is driven high at time 503, after the second row address line R52 is deasserted, although in some embodiments, the first drive control line S51 may be driven high after the first row address line R51 is deasserted but before the second row address line R52 is deasserted. Once the first drive control line is high, the charge transistor T52 turns on to charge the display capacitance and the circuit 500 behaves in much the same way as circuit 300 to change the state of the electro-optical element E51 from "white" to "black."

The first row address line R51 is reasserted at time 506, turning on the selection transistor T51. Since the voltage on the first column data line D51 is now at 0 volts and the first drive control line S51 is at −V, the control capacitor C51 is charged to +V and circuit 500 behaves similarly to circuit 300, changing the electro-optical element from "black," back to "white." One difference between the operation of circuit 500 and circuit 300 is that, in the circuit 500, the first drive control line is not asserted until time 508, after the second row address line R52 is deasserted. Voltage changes in the second row address line R52 may be capacitively coupled to node A51, but because the charge transistor T52 is on at the time 507 as the second row address line R52 is changing, the capacitive coupling is mitigated somewhat and the voltage at node A51 is changing at that time anyway.

The first row address line R51 is asserted again at time 511, turning on the selection transistor T51. Since the voltage on the first column data line D51 is again at 0 volts and the first drive control line S51 is at −V, the control capacitor C51 keeps its charge of +V, the charge transistor T52 remains on, and the circuit 500 behaves similarly to circuit 300 to keep the electro-optical element "white" after time 514, although the first drive control line S51 is not asserted until time 513, after the second row address line R52 is deasserted. The pulse on the second row address line R52 at time 512 may still be capacitively coupled to node A51. But because the charge transistor T52 is on, the effects of the coupled noise may be mitigated. However, similarly to circuit 400, noise below −V may be generated on the negative-going edge of the pulse on the second row address line R52 after time 512 and the circuit 500 may be designed to accommodate that.

Figure 6A:
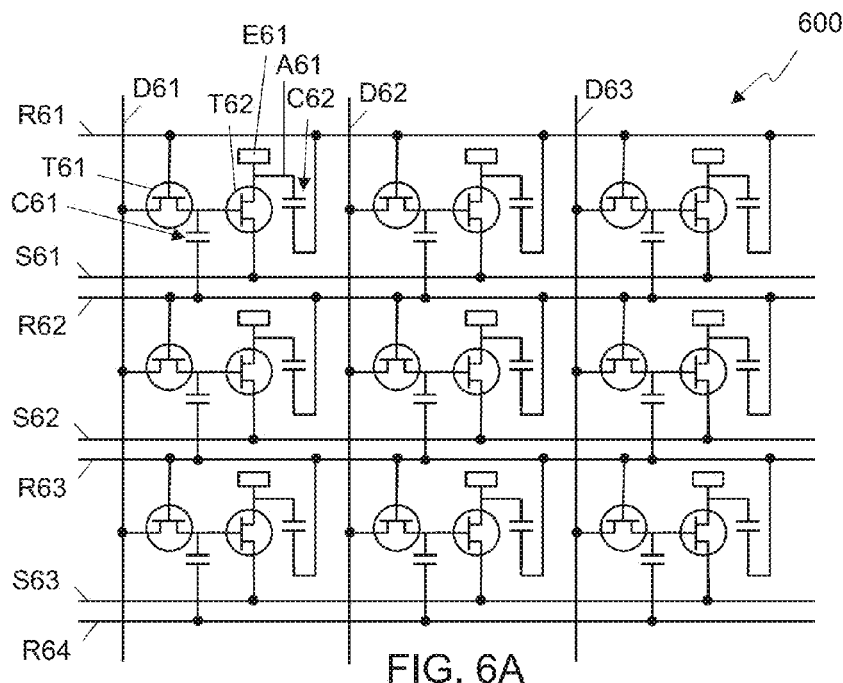
FIG. 6A is a schematic diagram of an array of circuits to control an array of electro-optical elements according to an alternative embodiment.

FIG. 6A is a schematic diagram of an array of circuits 600 to control an array of electro-optical elements according to an alternative embodiment. A 3×3 array of circuits is shown which may be thought of as a small part of a larger array of circuits with many more rows and many more columns than those shown in FIG. 6A. The circuits include the basic circuitry as shown in FIG. 1. Various row address lines such as the first row address line R61, the second row address line R62 and the third address line R63 may be used to select a particular row of the array. Various column data lines, such as the first column data line D61, the second column data line D62, and the third column data line D63, may be used to send voltages representing intended display characteristics to the currently selected row of circuits. The embodiment shown in FIG. 6A provides separate drive control lines similar to circuit 400 of FIG. 4A, such as the first drive control line S61, the second drive control line S62, and the third drive control line S63.

The upper left circuit may be typical of any of the circuits of the array 600 and is described in more detail to illustrate the operation of the circuits of the embodiment shown in FIG. 6A. The circuit may include a selection transistor T61 coupled to the first row address line R61 and the first column data line D61. The first row address line R61 may be coupled to the control gate of the selection transistor T61 and the first column data line D61 may be coupled to the drain of the selection transistor T61. A charge transistor T62 may be coupled to the selection transistor T61 and the electro-optical element E61 associated with the particular circuit. The control gate of the charge transistor T62 may be coupled to the source of the selection transistor T61 and the drain of the charge transistor T62 may be coupled to the electro-optical element E61. A control capacitor C61 may be coupled between the control gate of the charge transistor T62, and second row address line R62. The first drive control line S61 may be coupled to the source of the charge transistor T62. The embodiment shown includes a hold capacitor C62 coupled between the electro-optical element E61 and the first row address line R61, similarly to the topology of circuit 300. The electro-optical element may have a second terminal at about +5 volts, so that the electric field applied across the electro-optical element E61 may be equal to the voltage level at node A61 minus about 5 volts.

Figure 6B:
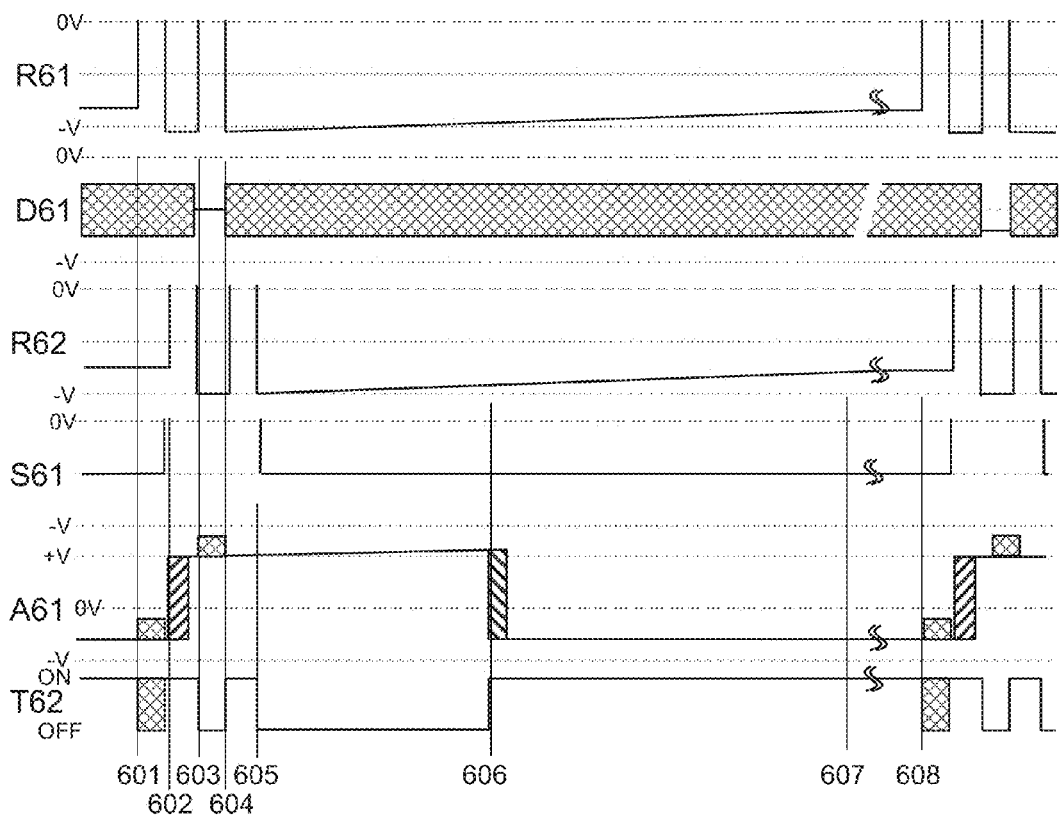
FIG. 6B shows waveforms at various nodes of the circuit of FIG. 6A.

FIG. 6B shows waveforms at various nodes of the circuit 600. Time progresses from left to right but may not be uniform. In particular, a much longer period of time than would be indicated by the waveform may elapse at each break shown, such as the break between time 607 and time 608. The waveforms for the first row address line R61, the first column data line D61, the second row address line R62, the first drive control line S61, and node A61 are shown with a voltage scale ranging from −V to 0 volts, although it can be assumed that the waveforms may be driven as high as +V volts at times that the waveform disappears above the 0V indicator line. The voltage range from 0 volts to +V is not shown to allow the negative voltage range to be shown in greater detail. For the purposes of this embodiment, −V may be −20 volts and +V may be +20 volts, although other embodiments may use different voltages, depending on the display technology being controlled. The various column data lines may be in a range of between about −15 volts to about −5 volts for the embodiment of FIG. 6A. The waveform for the charge transistor T62 does not represent a voltage, but represents the switching state of the charge transistor T62. In the embodiment shown, it is assumed that the threshold voltage to turn on either transistor is about 2 volts and that the voltage drop from source to drain if a transistor is on is negligible.

At the beginning of the waveforms of FIG. 6B, node A61 is about −10 volts, which may create an electric field of about −15 volts across the electro-optical element E61, due to the +5 volt potential on the other terminal of the electro-optical element E61, to set the state of the electro-optical element E61, such as "white." The first row address line R61 is asserted at time 601, turning on the selection transistor T61. Because the voltage level of the first column data line D61 is unknown at time 601, the voltage level at the source of the charge transistor T62 and the amount of charge stored on the control capacitor C61 are both unknown. This makes the switching state of the charge transistor T62 unknown as is shown at time 601. However, because the drive control line S61 is at about −10 volts, the voltage at node A61 may not change at time 601. It should be noted that because the hold capacitor C62 is coupled to the first row address line R61, pulses on the first row address line R61 may capacitively couple to node A61. But since the voltage at node A61 may be changing around that time anyway, the coupled noise may not be an issue.

The second row address line R62 is driven high at time 602. Because the control capacitor C61 does not have a negative charge, this turns on the charge transistor T62. The drive control line S61 is at +20 volts at time 602, so the display capacitance starts to charge toward about +20 volts. The second row address line R62 may stay high long enough for the display capacitance to fully charge, leaving the voltage at node A61 at about +20 volts by the time that the second row address line R62 is driven back to about −20 volts at some time before time 603.

The first row address line R61 is asserted at time 603, turning on the selection transistor T61 and allowing the voltage applied at the first column data line D61, about −10 volts, to flow through the selection transistor T61 to the control capacitor C61. This puts about a 4-10 volt charge on the control capacitor C61, because the control capacitor C61 is coupled to the second row address line R62, which is at about −20 volts at time 603. But because both the first charge control line S61 and node A61 are at about +20 volts, the charge transistor T62 is turned off.

At time 604, the first row address line R61 is driven to about −20 volts and at some time after time 604, the second row address line R62 may be driven high to select the next row of circuits. This may turn on the charge transistor T62, but since the drive control line S61 is still at about +20 volts, node A61 is left at about +20 volts as well. The second row address line R62 is driven to about −20 volts at time 605 and the drive control line S61 is driven to about −10 volts soon after time 605. This turns off the charge transistor T62. The second row address line R62 linearly ramps from about −20 volts to about −15 volts from time 605 to time 607. The first row address line R61 also linearly ramps from about −20 volts to about −15 volts and because the amount of time between time 604 where the first row address line R61 begins to ramp and the time 605, where the second row address line R62 begins to ramp, is so much shorter than the time period from time 605 to time 607, the voltage difference between the first address line R61 and the second address line R62 during the ramp is very small.

As the second row address line R62 ramps from about −20 volts to about −15 volts, the voltage at the control gate of the charge transistor T62 ramps from about −10 volts to about −5 volts, due to the about +10 volts stored on the control capacitor C61. With the drive control line S61 at about −10 volts and the voltage at node A61 at about +20 volts, the charge transistor T62 is turned off until the voltage at the control gate of the charge transistor T62 is higher than the voltage at the source of the charge transistor T62, or the first drive control line S61, by at least the voltage threshold of the charge transistor T62, which is about 2 volts in this example. So once the second row address line R62 reaches about −18 volts at time 606, which puts the control gate of the charge transistor T62 at about −18 volts, the charge transistor T62 turns on, discharging the display capacitance and driving the voltage at node A61 to about −10 volts starting at time 606.

By varying the voltage of the first column data line D61, which varies the voltage stored on the control capacitor C61, the duty cycle of the electric field across the electro-optical element E61 may be varied, which may be useful for some display technologies to control such characteristics as brightness to create a grey-scale display. For example, if the voltage on the first column data line D61 at time 603 is less than about −13 volts, the control gate of the charge transistor T62 may not reach the voltage level of about −8 volts that is able to turn on the charge transistor T62 as the second row address line reaches about −15 volts at time 607, leaving the voltage at node A61 ramping from about +20 volts to about +25 volts due to the ramping of the first row address line, and creating a duty cycle of about (time 607-time 602)/(frame refresh time) which may be near 100%. In contrast, if the voltage on the first column data line D61 at time 603 is greater than about −8 volts, the control gate of the charge transistor T62 may be high enough at time 605 that the charge transistor T62 turns on right away creating a duty cycle of about (time 605-time 602)/(frame refresh rate) which may be near 0%.

Figure 7A:
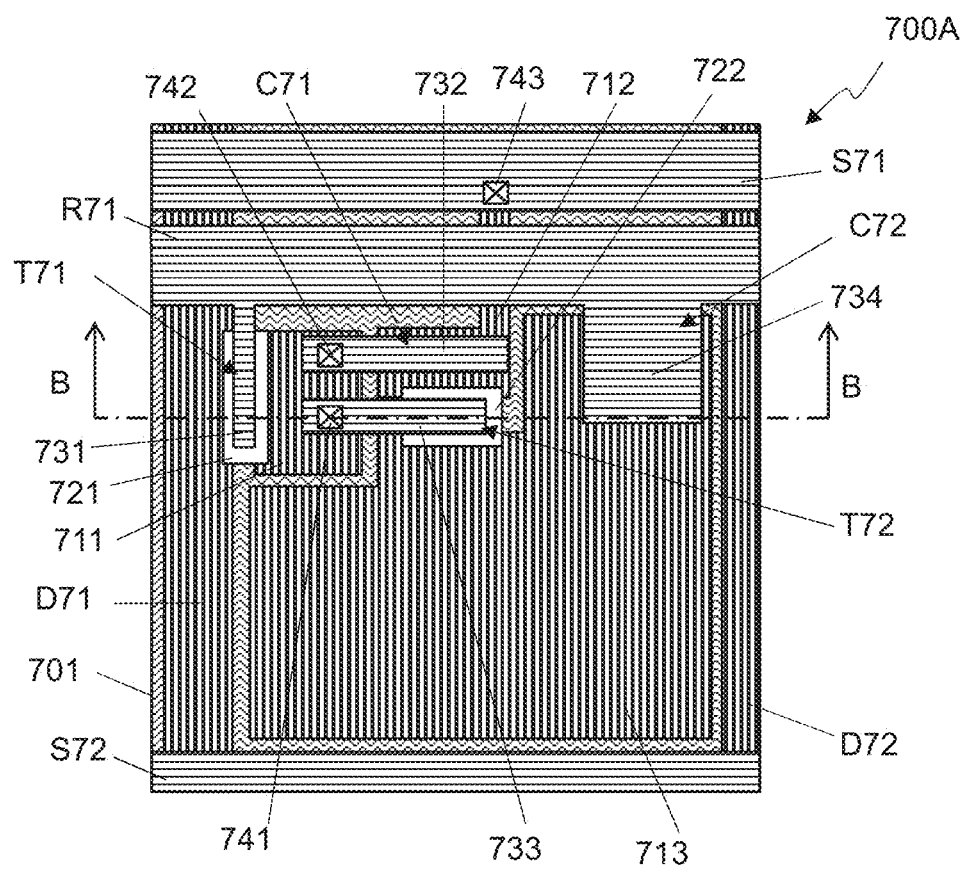
FIGS. 7A and 7B are a plan view and a cross-sectional side view of an embodiment of a circuit to control an electro-optical element using thin film transistors.
Figure 7B:
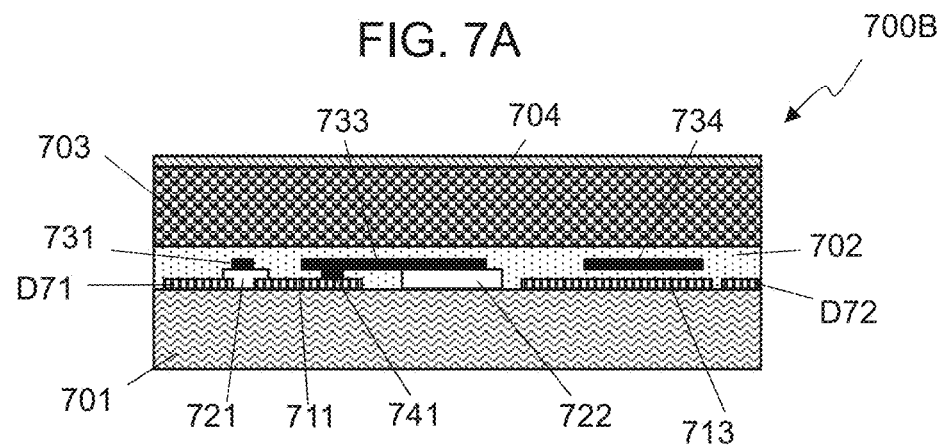

FIG. 7A is a plan view, and FIG. 7B is a cross-sectional side view of an embodiment of a circuit 700 to control an electro-optical element using thin film transistors. The section line B:B in FIG. 7A shows the location of the cross-sectional view of FIG. 7B. The portion shown may be a part of a larger array of circuits with electro-optical elements. The plan view of the circuit 700A shows the circuit but does not include the display contact 704, the electro-optical material 703 or the insulating material 702 so that the details of the circuit 700 may be seen. The display contact 704, the electro-optical material 703 and the insulating material 702 may be seen in the cross-sectional view of the circuit 700B. The details of the circuit layout may not be optimized and may not be valid for all thin-film technologies. The circuit layout may be used as one embodiment of many possible embodiments thin-film transistors. For example, the embodiment shown employs a top-gate thin film transistor architecture, whereas other embodiments may employ a bottom-gate thin film transistor architecture. Specific details of the thin-film process may be omitted as unimportant to understanding the high level circuit, but may be understood by one of ordinary skill.

The circuit 700 may be may be built on a substrate 701. The substrate 701 may be any type of suitable material including, but not limited to, glass, ceramic, bulk silicon, polymeric material, plastic, or other material. Depending on the material used for the substrate 701, and the materials used for the thin-film transistors, the electro-optical material, and the processes used to construct the circuit 700, the circuit may be rigid or flexible. The circuit 700 may be similar to the circuits of FIG. 4A, with the hold capacitor C72 coupled to the first row address line R71, and the drain control line S71 coupled to the control capacitor C71 and the source of the charge capacitor T72. The following description may apply to both the cross-sectional view of the circuit 700B and the plan view of the circuit 700A, and both views may be useful for understanding the circuit 700.

A first layer of patterned conductors may be deposited on the substrate 701 including the first column data line D71, the source 711 of the selection transistor T71, a conductive area 712, a plate 713, and the second column data line D72. The conductive area 712 may function as the source of the charge transistor T72 and a part of control capacitor C71. The plate 713 may function as a part of the hold transistor C72 and a coupler to the electro-optical material 703. The conducting material of the first layer may any conducting material, including but not limited to, various metals such as aluminum, nickel, copper, various metal alloys or metallic compounds, polysilicon, clear conductors such as indium-tin-oxide (ITO), organic materials, or any other type of material. The conducting material may be deposited on the substrate using various techniques, depending on the embodiment, such as electro-plating, sputtering, chemical vapor deposition, spraying, printing, painting, or any other method. The conductive material may be deposited just in the locations where the final patterns are desired using printing, spraying, or some other process. In some embodiments, the layer of conductive material may be deposited over the entire substrate and then patterned using traditional lithography techniques. Any method may be used to create the patterns of conductive material.

Semiconducting and gate dielectric material may be deposited to create the transistors. Semiconductor and gate dielectric area 721 may define the channel of the selection transistor T71, and semiconductor and gate dielectric area 722 may define the channel of the charge transistor T72. An insulating material 702, such as silicon oxide, silicon nitride, various polymers, organic materials, or other insulating material, may be used to separate the various layers where no direct contact is desired. The insulating material 702 may be deposited at several different times in the process and may actually include multiple layers of insulating material.

Another layer of conductive material may be deposited over the semiconducting and gate dielectric material 721, 722 and insulating material 702. The second layer of conductive material may utilize the same material as used in the first conductive layer or may use a different conductive material, depending on the embodiment. The second conductive layer may include the first drive control line S71, the first row address line R71, a plate 732 of the control capacitor C71, the control gate 733 of the charge transistor T72, and the second drive control line S72. The plate 732 of the control capacitor C71 may be coupled to the source 711 of the selection transistor T71 by via 742, the control gate 733 of the charge transistor T72 may be coupled to the source 711 of the selection transistor T71 by via 741, and conductive area 712 may be coupled to the drive control line S71 by via 743, The first row address line R71 may include protrusions to function as the control gate 731 of the selection transistor T71 and a plate 734 of the hold capacitor C72.

Electro-optical material 703 may be included above the various layers. A display contact layer 704 may be deposited on top of the electro-optical material 703. If the circuit is operating, a charge may be created on the plate 713 that creates an electrical field between the plate 713 and the display contact layer 704, which may be grounded or held at some other potential. The electric field between the plate 713 and the display contact layer 704 may control the electro-optical material 703 to change a characteristic of the electro-optical material 703.

As can be seen from the plan view of the circuit 700A, the row address lines R71, and the drive control lines S71, S72, are substantially parallel. Even though the first row address line R71 may include multiple protrusions, the overall path of the first row address line R71 can easily be seen as parallel to the drive control line S71. The column data lines D71, D72 are substantially perpendicular to the row address lines R71 and drive control lines S71, S72.

Depending on the material used for the various layers, including the semiconducting materials 721, 722, the selection transistor T71 and charge transistor T72 may be various types of thin-film transistors (TFT) including silicon TFTs, organic TFTs, printable TFTs, flexible TFTs or any other type of TFT. While in some embodiments, both the selection transistor T71 and the charge transistor T72 may be of a common type, other embodiments may use different types of transistors. In some embodiments the selection transistor T71 may have a higher ratio of gate width to gate length than the charge transistor T72, such as the embodiment of circuit 700.

Figure 8:
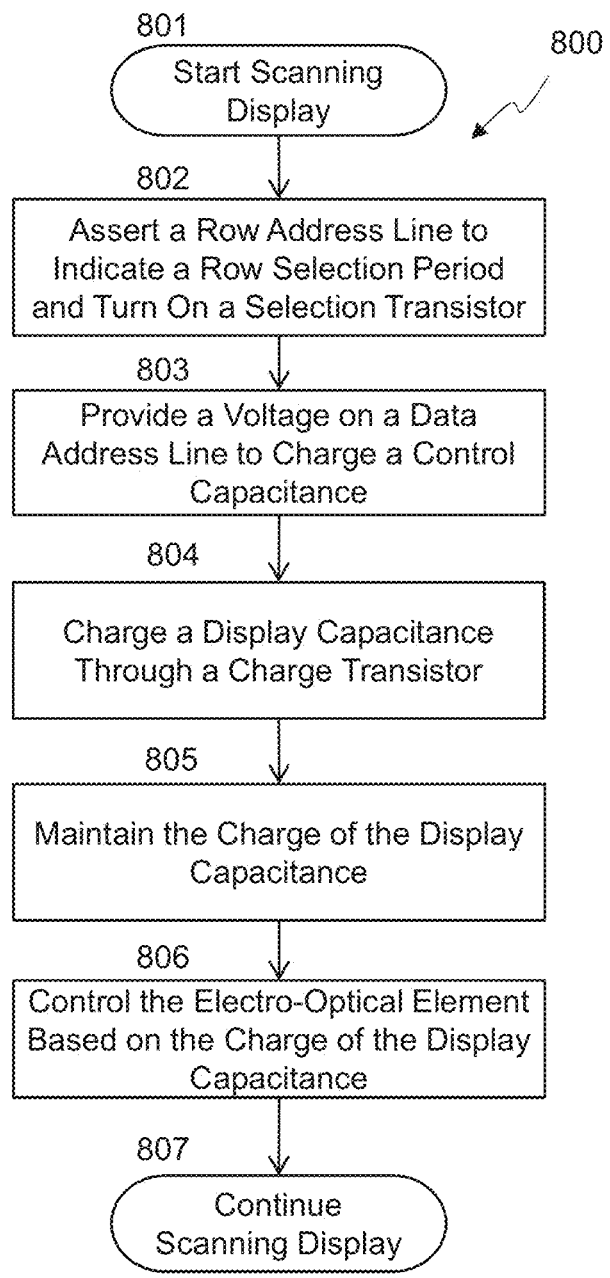
FIG. 8 is a flowchart of an embodiment of a method to control an electro-optical element.

FIG. 8 is a flowchart 800 of an embodiment of a method to control an electro-optical element. The method may begin at block 801 as the display is scanned. In some embodiments, the scan may occur at a regular interval referred to as a frame refresh rate while other embodiments may only scan the display if the content of the display changes. The method may continue at block 802 by asserting a row address line coupled to the selection transistor to indicate a first period of time as the row selection period. The method may continue at block 803 by providing a voltage level during the row selection period, through a column data line coupled to the selection transistor, to set an amount of charge to store in the control capacitance. A charge may be stored in the control capacitance during the row selection period using the selection transistor. The charge of the control capacitance may indicate a desired characteristic of the electro-optical element associated with the circuit.

At block 804, the display capacitance is charged using the charge transistor based on the charge of the control capacitor. In some embodiments, the display capacitance may include capacitance from either one of the hold capacitor and the electro-optical element, or both. In some embodiments, another control line, such as the drive control line, may be asserted as a part of the method to charge the display capacitance. Depending on the embodiment, the time it takes to charge the display capacitance may be longer then the row selection period.

Once the display capacitance has been charged to the desired value, the charge may be maintained at block 805. Depending on the embodiment and the charge level of the display capacitance, the charge of the display capacitance may be maintained by turning off the charge transistor on that the capacitance is not discharged. At other times, the charge of the display capacitance may be maintained by turning on the charge transistor to couple the display capacitance to a line having the desired voltage level. In other embodiments, the charge of the display capacitance may be changed from one charge level to a different charge level after a delay based on the voltage level of the control capacitance. The method may continue at block 806 by controlling the electro-optical element based on the charge of the display capacitance and the method may conclude at block 807 as other circuitry continues to scan the display.

Figure 9:
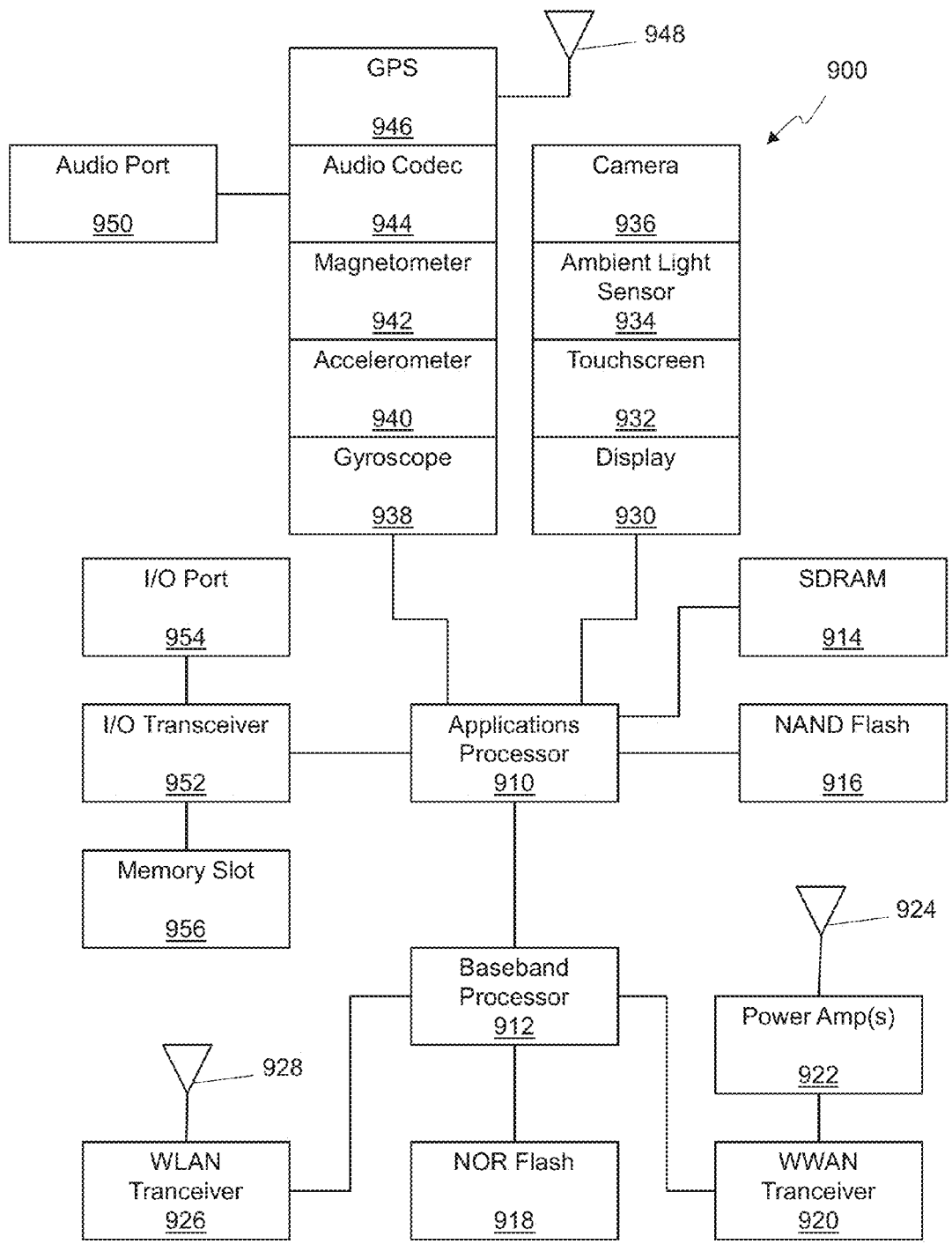
FIG. 9 a block diagram of an information handling system.

Referring now FIG. 9, a block diagram of an information handling system 900. Information handling system 900 of FIG. 9 may tangibly embody a display 930, portions of which may be shown in and described with respect to FIG. 1 through FIG. 7. Information handling system 900 may represent a computer, a smartphone, a tablet, or any other type of information handling system. Although information handling system 900 represents one example of several types of computing platforms, information handling system 900 may include more or fewer elements and/or different arrangements of elements than shown in FIG. 9, and the scope of the claimed subject matter is not limited in these respects.

In one or more embodiments, information handling system 900 may include an applications processor 910 and a baseband processor 912. Applications processor 910 may be utilized as a general purpose processor to run applications and the various subsystems for information handling system 900. Applications processor 910 may include a single core or alternatively may include multiple processing cores wherein one or more of the cores may comprise a digital signal processor or digital signal processing core. Furthermore, applications processor 910 may include a graphics processor or coprocessor disposed on the same chip, or alternatively a graphics processor coupled to applications processor 910 may comprise a separate, discrete graphics chip. Applications processor 910 may include on board memory such as cache memory, and further may be coupled to external memory devices such as synchronous dynamic random access memory (SDRAM) 914 for storing and/or executing applications during operation, and NAND flash 916 for storing applications and/or data even when information handling system 900 is powered off. Baseband processor 912 may control the broadband radio functions for information handling system 900. Baseband processor 912 may store code for controlling such broadband radio functions in a NOR flash 918. Baseband processor 912 controls a wireless wide area network (WWAN) transceiver 920 which is used for modulating and/or demodulating broadband network signals, for example for communicating via a WiMAX network based on IEEE 802.16p or 3GPP LTE network or the like. The WWAN transceiver 920 couples to one or more power amps 922 respectively coupled to one or more antennas 924 for sending and receiving radio-frequency signals via the WWAN broadband network. The baseband processor 912 also may control a wireless local area network (WLAN) transceiver 926 coupled to one or more suitable antennas 928 and which may be capable of communicating via a Wi-Fi, Bluetooth, and/or an amplitude modulation (AM) or frequency modulation (FM) radio standard including an IEEE 802.11 a/b/g/n. standard or the like. It should be noted that these are merely example implementations for applications processor 910 and baseband processor 912, and the scope of the claimed subject matter is not limited in these respects. For example, any one or more of SDRAM 914, NAND flash 916 and/or NOR flash 918 may comprise other types of memory technology such as magnetic memory, chalcogenide memory, phase change memory, or ovonic memory, and the scope of the claimed subject matter is not limited in this respect.

In one or more embodiments, applications processor 910 may drive a display 930 according to embodiments described herein for displaying various information or data, and may further receive touch input from a user via a touch screen 932 for example via a finger or a stylus. An ambient light sensor 934 may be utilized to detect an amount of ambient light in which information handling system 900 is operating, for example to control a brightness or contrast value for display 930 as a function of the intensity of ambient light detected by ambient light sensor 934. One or more cameras 936 may be utilized to capture images that are processed by applications processor 910 and/or at least temporarily stored in NAND flash 916. Furthermore, applications processor may couple to a gyroscope 938, accelerometer 940, magnetometer 942, audio coder/decoder (CODEC) 944, and/or global positioning system (GPS) controller 946 coupled to an appropriate GPS antenna 948, for detection of various environmental properties including location, movement, and/or orientation of information handling system 900. Alternatively, controller 946 may comprise a Global Navigation Satellite System (GNSS) controller. Audio CODEC 944 may be coupled to one or more audio ports 950 to provide microphone input and speaker outputs either via internal devices and/or via external devices coupled to information handling system via the audio ports 950, for example via a headphone and microphone jack. In addition, applications processor 910 may couple to one or more input/output (I/O) transceivers 952 to couple to one or more I/O ports 954 such as a universal serial bus (USB) port, a high-definition multimedia interface (HDMI) port, a serial port, and so on. Furthermore, one or more of the I/O transceivers 952 may couple to one or more memory slots 956 for optional removable memory such as secure digital (SD) card or a subscriber identity module (SIM) card, although the scope of the claimed subject matter is not limited in these respects.

Unless otherwise indicated, all numbers expressing quantities of elements, optical characteristic properties, and so forth used in the specification and claims are to be understood as being modified in all instances by the term "about." Accordingly, unless indicated to the contrary, the numerical parameters set forth in the preceding specification and attached claims are approximations that can vary depending upon the desired properties sought to be obtained by those skilled in the art utilizing various principles of the present disclosure. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of this disclosure are approximations, the numerical values set forth in the specific examples are reported as precisely as possible. Any numerical value, however, inherently contains certain errors necessarily resulting from the standard deviations found in their respective testing measurements. The recitation of numerical ranges by endpoints includes all numbers subsumed within that range (e.g. 1 to 5 includes 1, 1.5, 2, 2.75, 3, 3.80, and 5).

As used in this specification and the appended claims, the singular forms "a", "an", and. "the" include plural referents unless the content clearly dictates otherwise. Furthermore, as used in this specification and the appended claims, the term "or" is generally employed in its sense including "and/or" unless the content clearly dictates otherwise. As used herein, the term "coupled" includes direct and indirect connections. Moreover, where first and second devices are coupled, intervening devices including active devices may be located there between.

The description of the various embodiments provided above is illustrative in nature and is not intended to limit this disclosure, its application, or uses. Thus, different variations beyond those described herein are intended to be within the scope of embodiments. Such variations are not to be regarded as a departure from the intended scope of this disclosure. As such, the breadth and scope of the present disclosure should not be limited by the above-described exemplary embodiments, but should be defined only in accordance with the following claims and equivalents thereof.

What is claimed is:

1. An information handling system comprising:
    a processor;
    a memory coupled to the processor; and
    a display coupled to the processor;
    wherein the display comprises an array of electro-optical elements and an array of control circuits coupled to respective electro-optical elements; and
    wherein a control circuit comprises:
        a selection transistor coupled to a row address line and a column data line;
        a charge transistor coupled to the selection transistor and the respective electro-optical element; and
        a control capacitor coupled to the charge transistor;
    wherein the selection transistor has a faster switching speed than the charge transistor and the charge transistor has lower leakage current than the selection transistor.

2. The information handling system of claim 1, wherein the electro-optical elements are electrophoretic elements.

3. The information handling system of claim 1, wherein the control circuit further comprises a hold capacitor, wherein the electro-optical elements are controllable by electric fields that are dependent on charges stored in respective hold capacitors.

4. The information handling system of claim 1, wherein the control circuit further comprises a hold capacitor; and
    wherein a control gate of the selection transistor is coupled to the row address line;
    a drain of the selection transistor is coupled to the column data line;
    a control gate of the charge transistor is coupled to a source of the selection transistor;
    a drain of the charge transistor is coupled to the electro-optical element and to a first terminal of the hold capacitor; and
    a first terminal of the control capacitor is coupled to the control gate of the charge transistor.

5. The information handling system of claim 1, wherein the first transistor and second transistor are thin film transistors on a substrate comprising the array of electro-optical elements.

6. A display comprising:
    an array of electro-optical elements, wherein an electro-optical element of the array of electro-optical elements are controllable by an electric field;
    a selection transistor to set a control capacitor to a first voltage during a row selection period, wherein the first voltage is based on a target characteristic of the electro-optical element; and
    a charge transistor to set a hold capacitor to second voltage during a charging period based on a voltage level of the control capacitor;
    wherein the electric field across the electro-optical element is created based on a voltage level of the hold capacitor; and
    wherein the selection transistor has a faster switching speed than the charge transistor and the charge transistor has lower leakage current than the first transistor.

7. The display of claim 6, further comprising:
a row address line, coupled to the selection transistor, to indicate the row selection period;
a column data line, coupled to selection transistor, to set the first voltage; and
a drive control line, coupled to the charge transistor, to set the second voltage.

8. The display of claim 6, wherein the charging period is longer than the row selection period.

9. The display of claim 6, further comprising:
additional row address lines to indicate other row selection periods that are non-overlapping with the row selection period, wherein the charging period overlaps with the other row selection periods.

10. The display of claim 6, wherein the first transistor and second transistor are thin film transistors on a substrate that includes the array of electro-optical elements.

11. The display of claim 6, wherein the first transistor and second transistor are organic thin film transistors on a flexible substrate that includes the electro-optical element.

12. An apparatus comprising:
a first transistor to charge a first capacitance based on a desired characteristic of an electro-optical element; and
a second transistor to charge a second capacitance based on the charge of the first capacitance;
wherein an electric field based on the charge of the second capacitance is to control a characteristic of the electro-optical element; and
wherein the first transistor has a faster switching speed than the second transistor and the second transistor has lower leakage current than the first transistor.

13. The apparatus of claim 12, wherein a time to charge the second capacitance is longer than a time to charge the first capacitance.

14. The apparatus of claim 12, wherein at least some of the second capacitance is included in the electro-optical element.

15. The apparatus of claim 12, further comprising a hold capacitor to provide at least some of the second capacitance.

16. The apparatus of claim 12, wherein the first capacitance is smaller than the second capacitance.

17. The apparatus of claim 12, wherein the first transistor, the second transistor, or both, comprise a thin film transistor (TFT).

18. The apparatus of claim 12, wherein the first transistor has lower on-state resistance than the second transistor.

19. A circuit to control an electro-optical element, the circuit comprising:
a first transistor coupled to a first control line and a second control line;
a second transistor coupled to the first transistor and the electro-optical element; and
a control capacitor coupled to the second transistor;
wherein the first transistor has a faster switching speed than the second transistor and the second transistor has lower leakage current than the first transistor.

20. The circuit of claim 19, wherein the control capacitor has a smaller capacitance than the electro-optical element.

21. The circuit of claim 19, further comprising:
a hold capacitor coupled to the electro-optical element, wherein the control capacitor has a smaller capacitance than the hold capacitor.

22. The circuit of claim 19, further comprising:
a hold capacitor having a first terminal coupled to the electro-optical element, wherein a second terminal of the hold capacitor is coupled to the first control line.

23. The circuit of claim 19, wherein the first transistor, the second transistor, or both, comprise a thin film transistor (TFT).

24. The circuit of claim 19, wherein the first transistor or the second transistor, or combinations thereof, comprises a flexible thin film transistor (TFT), an organic TFT, or a printable TFT, or combinations thereof.

25. The circuit of claim 19, wherein the first transistor has a higher ratio of gate width to gate length than the second transistor.

26. A display comprising:
an array of electro-optical elements; and
an array of control circuits coupled to respective electro-optical elements;
wherein a control circuit comprises:
a selection transistor coupled to a row address line and a column data line;
a charge transistor coupled to the selection transistor and the respective electro-optical element; and
a control capacitor coupled to the charge transistor;
wherein the selection transistor has a faster switching speed than the charge transistor and the charge transistor has lower leakage current than the selection transistor.

27. The display of claim 26, wherein the electro-optical elements are electrophoretic elements.

28. The display of claim 26, wherein the control circuit further comprises a hold capacitor, wherein the electro-optical elements are controllable by electric fields that are dependent on charges stored in respective hold capacitors.

* * * * *